United States Patent
Zhang et al.

(10) Patent No.: US 11,868,327 B2
(45) Date of Patent: Jan. 9, 2024

(54) METHOD AND APPARATUS FOR CREATING AND ADDING A BLOCK BASED ON A DIRECTED ACYCLIC GRAPH AND BUILDING A LEDGER

(71) Applicant: Jiheng Zhang, Hong Kong (CN)

(72) Inventors: Jiheng Zhang, Hong Kong (CN); Jiahao He, Hong Kong (CN); Guangju Wang, Hong Kong (CN); Guangyuan Zhang, Hong Kong (CN)

(73) Assignee: Jiheng Zhang, Hong Kong (CN)

( * ) Notice: Subject to any disclaimer, the term of this patent is extended or adjusted under 35 U.S.C. 154(b) by 247 days.

(21) Appl. No.: 17/420,685

(22) PCT Filed: Jan. 8, 2019

(86) PCT No.: PCT/CN2019/070888
§ 371 (c)(1),
(2) Date: Jul. 5, 2021

(87) PCT Pub. No.: WO2020/142907
PCT Pub. Date: Jul. 16, 2020

(65) Prior Publication Data
US 2022/0100724 A1    Mar. 31, 2022

(51) Int. Cl.
*G06F 16/22* (2019.01)
*G06F 16/27* (2019.01)

(52) U.S. Cl.
CPC .............. *G06F 16/22* (2019.01); *G06F 16/27* (2019.01)

(58) Field of Classification Search
CPC .................................. G06F 16/22; H04L 9/50
See application file for complete search history.

(56) References Cited

U.S. PATENT DOCUMENTS

| | | | |
|---|---|---|---|
| 9,641,342 B2* | 5/2017 | Sriram | H04L 9/3247 |
| 2017/0236120 A1 | 8/2017 | Herlihy et al. | |
| 2019/0386969 A1* | 12/2019 | Verzun | G06F 21/606 |
| 2020/0351116 A1* | 11/2020 | Jetzfellner | H04L 9/0643 |
| 2020/0387622 A1* | 12/2020 | Falk | G06F 7/08 |
| 2021/0350363 A1* | 11/2021 | Simpson | H04L 9/50 |
| 2022/0122062 A1* | 4/2022 | Mayblum | G06Q 20/381 |

FOREIGN PATENT DOCUMENTS

| | | |
|---|---|---|
| CN | 106897351 A | 6/2017 |
| CN | 108537543 A | 9/2018 |
| CN | 108985732 A | 12/2018 |
| WO | 2017109140 A1 | 6/2017 |

OTHER PUBLICATIONS

Search Report and Written Opinion of Corresponding PCT International Application No. PCT/CN2019/070888 dated Oct. 11, 2019.

* cited by examiner

*Primary Examiner* — Merilyn P Nguyen
(74) *Attorney, Agent, or Firm* — Idea Intellectual Limited; Margaret A. Burke; Sam T. Yip

(57) ABSTRACT

Provided are method and apparatus for creating and adding blocks based on a structured directed acyclic graph (DAG) and building a distributed ledger. In the present invention, a chain structure is extended to the structured DAG while Proof of Work (PoW) and Nakamoto consensus are used. Objectives of the present invention are, to scale up the capacity, shorten the latency, deconcentrate mining power and increase the chance of processing transactions with low or no fees without compromising security and decentralization.

11 Claims, 7 Drawing Sheets

METHOD AND APPARATUS FOR CREATING AND ADDING A BLOCK BASED ON A DIRECTED ACYCLIC GRAPH AND BUILDING A LEDGER

CROSS-REFERENCE TO RELATED APPLICATIONS

This application is a 371 application of International Patent Application Number PCT/CN2019/070888 filed Jan. 8, 2019, and the disclosure of which is incorporated herein by reference in its entirety.

FIELD OF THE INVENTION

The present invention relates to the field of computer technology, and in particular, to a method and apparatus for creating and adding a block based on a structured directed acyclic graph and building a distributed ledger.

BACKGROUND OF THE INVENTION

The blockchain technology is fundamentally a consensus mechanism design based on a chain structure of storing information in a distributed way over a peer-to-peer network. Taking Bitcoin as an example, a number of transactions is grouped together and stored in a block in less than 1 megabyte, and all blocks are connected in a chain-like structure. However, this may not be the most efficient way for storing information. With the help of cryptographic tools such as hash functions and public/private key for integrity check and authentication, Nakamoto consensus proposed based on the chain structure achieves both security and decentralization. The blockchain technology has achieved great success exemplified by Bitcoin and Ethereum. They are not only just social experiments which prove that a decentralized and secure public ledger system is possible, but also have a great impact on the financial system and give rise to a whole new ecosystem with expandable services and applications.

In a distributed public ledger system, an initial problem is who has the right to bookkeeping through formation of a block. This is resolved by using proof of work (PoW), which requires all participants to compete in solving cryptographic puzzles by tuning a nonce so that the hash result exhibits certain required pattern. It is such a difficult puzzle that likely in a given period of time, is long enough for propagating a block of a specified size over the network, only one miner can form such a block. The next question is how to coin the history since the information in a block needs to be verified. Miners, when creates future blocks, can choose not to agree with the information in a block in the history simply by forking from a position proceeding this block. Based on the honest majority assumption, all honest miners will eventually be able to collectively agree upon a chain of valid blocks, with invalid blocks on the forks. Thus, all blocks ever created form a tree, and it is the longest chain in the tree, referred as the Nakamoto chain, which is collectively created by all honest miners using PoW, thereby making the history.

With its growing acceptance, blockchain technology is encountering a serious bottleneck, which is an extremely limited capacity, i.e., a small number of transactions per second (TPS). Eliminating this bottleneck will be a significant breakthrough in advancing the blockchain technology, and will widen its application range. However, security and decentralization should not be compromised when scaling up the capacity.

Confined by the chain structure, what can be attempted to achieve the above objectives may be to increase the block size, equivalently decrease the time interval between blocks, or use both of them to increase the TPS. However, since larger blocks require longer time to be broadcasted over a peer-to-peer network, such an attempt would increase the chance of forming forked blocks, even in the absence of malicious miners. Therefore, it is necessary to explore other solutions beyond the chain structure in order to increase the capacity by an order of magnitude. Accordingly, it leads to an idea of expanding the chain of blocks to a directed acyclic graph (DAG) of blocks. In another existing method of creating blocks, every participant has a right to form a small block without PoW. Validity of a block is justified by subsequent blocks intended to be appended thereto either directly or indirectly. However, this method is vulnerable to splitting attack and requires performing computationally expensive task called "updating weights" to calculate the number of subsequent blocks appending to each block. In addition, capacity is not the only issue in the current blockchain systems. With an increasing hashing power, the cryptographic puzzle becomes more difficult. In expectation, miners with certain hashing power would be able to mine a certain number of blocks, thus collecting the corresponding reward. From the mathematical point of view, miners with certain hashing power can secure a certain number of blocks in return for rewards. However, huge fluctuations force the majority of miners to join mining pools in order to stabilize their income, leading to concentration of hashing power within a few big mining pools which is contrary to the initial thoughts of decentralization from the distributed ledger system. Another issue is the high latency since it takes a long time to confirm a transaction. In addition, from the consideration of self-interest, miners would try to pack transactions with high fees into their blocks to maximize their reward. Accordingly, there is substantially no chance to process transactions with low or no fees.

Therefore, a method for block creation and consensus establishment is needed to solve the technical problems of limited capacity, high latency and hashing power concentration existing in the prior art.

SUMMARY OF THE INVENTION

The present invention provides a method and apparatus for creating, adding blocks based on a structured directed acyclic graph, and building a corresponding distributed ledger to solve the technical problems of limited capacity, high latency and hashing power concentration existing in the prior art.

A first aspect of the present invention provides a method for creating blocks based on a structured directed acyclic graph (DAG) executed by node devices in a peer-to-peer network, which includes: acquiring a data structure of a local database, the data structure of the local database being established based on the structured DAG; creating a new block based on a connection relationship between the blocks characterized by the structured DAG, the connection relationship between the blocks including at least a connection relationship between milestone blocks, connection relationship between the blocks created by each of the node devices and connection relationship between the milestone block and the non-milestone block, the milestone blocks being used to confirm information of the new block and corresponding information of blocks directly or indirectly associated with the new block; and broadcasting information of the newly created block(s) to each of the node devices in the peer-to-peer network.

A second aspect of the present invention provides a method for adding blocks based on a structured directed acyclic graph (DAG) executed by node devices in a peer-to-peer network, which includes: receiving new block information sent by node device(s); determining whether the new block information satisfies a set of conditions; and if yes, adding the new block information to a local database of the node devices, the data structure of the local database being established based on the structured DAG, the structured DAG being used to characterize connection relationship between the blocks, the connection relationship between the blocks including at least a connection relationship between milestone blocks, connection relationship between the blocks created by each of the node devices and connection relationship between the milestone block and the non-milestone block, the milestone blocks being used to confirm information of the new block and corresponding information of blocks directly or indirectly associated with the new block.

A third aspect of the present invention provides a method for building a distributed ledger, which includes: acquiring new information of milestone blocks and corresponding information of blocks having a direct or indirect connection relationship with the milestone blocks; and updating local distributed ledger according to the acquired information of the new milestone block(s) and the blocks directly or indirectly connected therewith in order to obtain an updated local distributed ledger being built based on a structured DAG, the structured DAG being used to characterize connection relationship between blocks containing transaction information in the distributed ledger, the connection relationship between the blocks including at least a connection relationship between the milestone blocks, connection relationship between the blocks created by each of the node devices and connection relationship between the milestone blocks and non-milestone blocks, the milestone blocks being used to confirm information of the new block and corresponding information of blocks directly or indirectly associated with the new block.

A fourth aspect of the present invention provides an apparatus for creating blocks based on a structured directed acyclic graph (DAG), which includes: an acquiring unit acquiring a data structure of a local database, the data structure of the local database being established based on the structured DAG; a creation unit creating a new block based on a connection relationship between blocks characterized by the structured DAG, the connection relationship between the blocks including at least a connection relationship between milestone blocks, connection relationship between the blocks created by each of the node devices and connection relationship between the milestone blocks and non-milestone blocks, the milestone blocks being used to confirm information of the new block and corresponding information of blocks directly or indirectly associated with the new block; and a broadcasting unit broadcasting information of the newly created block to each of the node devices of the peer-to-peer network.

A fifth aspect of the present invention provides an apparatus for creating blocks based on a structured directed acyclic graph (DAG), which includes a memory and a processor, the memory storing machine-executable instructions and the processor reading and executing the machine-executable instructions to perform the method for creating blocks based on the DAG according to the first aspect of the present invention.

A sixth aspect of the present invention provides a storing medium including a program for performing the method for creating a block based on a structured directed acyclic graph (DAG) according to the first aspect of the present invention.

A seventh aspect of the present invention provides an apparatus for adding blocks based on a structured directed acyclic graph (DAG), which includes: a receiving unit receiving new block information sent by a node device; a first determining unit determining whether the new block information satisfies a set of conditions; and an adding unit adding the new block information to a local database of the node device if the new block information satisfies the set of conditions, the data structure of the local database being established based on the structured DAG, the structured DAG being used to characterize connection relationship between the blocks, connection relationship between the blocks including at least a connection relationship between milestone blocks, connection relationship between the blocks created by each of the node devices and connection relationship between the milestone blocks and non-milestone blocks, the milestone blocks being used to confirm information of the milestone blocks and corresponding information of blocks directly or indirectly associated with the milestone blocks.

An eighth aspect of the present invention provides an apparatus for adding blocks based on a structured directed acyclic graph (DAG), wherein the apparatus comprises a memory and a processor, the memory storing machine-executable instructions and the processor reading and executing the machine-executable instructions to perform the method for adding a block based on a structured directed acyclic graph (DAG) according to the second aspect of the present invention.

A ninth aspect of the present invention provides a storing medium on which a program for performing the method for adding a block based on a structured directed acyclic graph (DAG) according to the second aspect of the present invention.

A tenth aspect of the present invention provides a distributed ledger building apparatus including: an acquiring unit acquiring information of new milestone block and blocks directly or indirectly associated with the milestone blocks; and an updating unit updating a local distributed ledger according to the acquired information of the new milestone block and the blocks directly or indirectly associated with the milestone blocks to obtain an updated local distributed ledger being built based on a structured DAG, the structured DAG being used to characterize connection relationship between the blocks containing transaction information in the distributed ledger, connection relationship between the blocks including at least a connection relationship between milestone blocks, connection relationship between the blocks created by each of the node devices and connection relationship between the milestone blocks and non-milestone blocks, the milestone blocks being used to confirm the information of the new milestone block and corresponding information of blocks directly or indirectly associated with the new milestone block.

An eleventh aspect of the present invention provides an apparatus for building a distributed ledger, wherein the apparatus includes a memory and a processor, the memory stores machine-executable instructions and the processor reads and executes the machine-executable instructions to perform the method for building a distributed ledger according to the third aspect of the present invention.

A twelfth aspect of the present invention provides a storing medium on which a program for performing the method for building a distributed ledger according to the third aspect of the present invention.

A thirteenth aspect of the present invention provides a structured DAG-based block data processing apparatus including:
- a creation module acquiring a data structure of a local database being established based on the structured DAG, creating a new block by using a connection relationship between blocks characterized by the structured DAG, the connection relationship between the blocks including at least a connection relationship between milestone blocks, connection relationship between the blocks created by each of the node devices and connection relationship between the milestone blocks and non-milestone block, the milestone blocks being used to confirm information of the new milestone block and corresponding information of blocks directly or indirectly associated with the new milestone block, and broadcasting information of a newly created block to each of the node devices of the peer-to-peer network;
- an adding module receiving the new block information sent by each of the node devices, determining whether the new block information satisfies a set of conditions; if the new block information satisfies the set of conditions, adding the new block information to a local database of the node device; and
- a distributed ledger building module acquiring information of a new milestone block and corresponding information of blocks directly or indirectly associated with the new milestone block, and updating a local distributed ledger according to the acquired information of the new milestone block and corresponding information of the blocks directly or indirectly associated with the new milestone block to obtain an updated local distributed ledger being built based on the structured DAG, the structured DAG being used to characterize the connection relationship between the blocks containing the transaction information in a distributed ledger.

Advantages of the present invention over the prior art include: by creating and adding blocks at multiple node devices based on a structured directed acyclic graph and building a distributed ledger, capacity is scaled up, latency is shortened, and hashing power is decentralized.

In the method for creating blocks based on a structured DAG of the present invention, when the node device creates the block, acquiring the data structure of his/her local database established based on the structured DAG, creating a new block by using a connection relationship between the blocks characterized by the structured DAG, and broadcasting information of the newly created block to each node device of the peer-to-peer network. Because the connection relationship between the blocks, including a connection relationship between the milestone blocks, the connection relationship between the blocks created by each node device and the connection relationship between the milestone block and the non-milestone block, is used when creating the block, the connectivity between blocks is enhanced, a large-scale consensus is reached through confirmation of the milestone block, and the transaction is processed and confirmed quickly, thereby increasing the throughput, shortening the latency and decentralizing hashing power on the premise of ensuring security and decentralization.

In the method for adding a block based on a structured directed acyclic graph DAG of the present invention, when the node device receives new block information, it first determines whether the new block information satisfies a set of conditions, and if so, the new block information will be added to a local database of the node device. Because the data structure of the local database is established based on the structured DAG and capable of characterizing the connection relationship between blocks, the connectivity between blocks is enhanced and node devices in the network maintain the same data structure, thereby increasing the throughput, shortening the latency and decentralizing hashing power with an assurance of security and decentralization.

The method for building a distributed ledger of the present invention acquires information of a new milestone block and corresponding information of blocks directly or indirectly associated with the new milestone block, and updates the local distributed ledger according to the acquired information of the new milestone block and the blocks directly or indirectly associated with the new milestone block to obtain an updated local distributed ledger. Because a large-scale consensus is reached through confirmation of the milestone block, and the transaction is processed and confirmed more quickly, with an assurance of security and decentralization, throughput is thereby increased, latency is shortened, hashing power is decentralized and a uniform distributed ledger is established.

BRIEF DESCRIPTION OF DRAWINGS

The drawings are only for the purpose of illustrating the preferred embodiments of the present invention and are not intended to be limiting. Throughout the drawings, the same reference numerals are used to refer to the same parts. In the drawings.

DETAILED DESCRIPTION OF THE INVENTION

Initially, main objectives of the present invention will be explained. The present invention provides a method for creating and adding blocks based on a structured DAG and building a distributed ledger, so that node devices of different miners can reach consensus in a large scale based on proof of work (PoW) and build the same distributed ledger. In addition, the present invention also provides a mem-pool transaction assignment method based on the structured DAG to substantially ignore the probability that a transaction is processed by more than one miner. The result is a significant scale-up of the capacity without sacrificing security and decentralization.

In various embodiments of the present invention, by using PoW and Nakamoto consensus, chain structure is extended into the structured DAG, while in the absence of compromising security and decentralization, capacity is scaled up, latency is shortened, mining power is decentralized, and the chance of processing transactions with low or even no fees is significantly increased.

Through embedding a Nakamoto chain in a structured DAG, the present invention has a strong connectivity and a function of recording information of each of the node devices. In this way, the security of the solutions by the present invention is ensured by that of the proven Nakamoto consensus. Based on the guaranteed security, the present invention takes advantage of the strong connectivity in a structured DAG to increase the throughput and shorten the latency. A structured DAG also provides an ordering of transactions so that all honest node devices (miners) will be able to build the same distributed ledger once they have reached consensus on the DAG.

Figure 2:
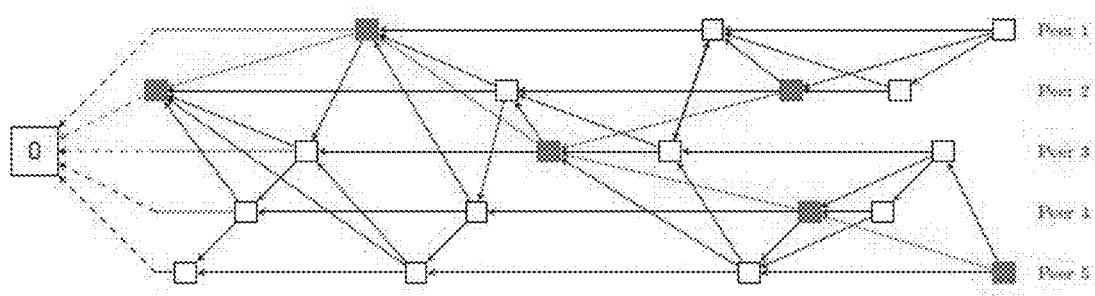
FIG. 2 is a schematic diagram of a structured DAG according to an embodiment of the present invention.

In some embodiment of the present invention, large (and usually relatively more difficult in terms of the cryptographic puzzles) block is broken down into multiple smaller (and usually relatively easier) blocks. For ease of implementation, the present invention diffuses each transaction wrapped by the smaller and easier blocks continuously throughout the time, instead of broadcasting a large batch of transactions once in a while. As mentioned in the above that a main bottleneck for blockchain is its linear structure which forbids parallelism and the tradeoff between block size and synchronization time. Using smaller (and easier) blocks allows fast peer-to-peer propagation and parallelism, thus significantly improve the throughput. For security and robustness, the present invention intersperses relatively more difficult blocks, referred herein as milestones, in the structured DAG for security purpose. The structured DAG starts from a genesis block which contains a set of trusted information. Notwithstanding that block is a milestone or not, the workflow of creating the block is the same. Every node device prepares three different pointers according to the latest information during the creation of a new block for subsequently processing valid transactions. A first pointer points to the node device's previous block, or the genesis block if the node device does not have any previous block. With this requirement, each node device will have a peer chain representing the state of that node device, which enables the possibility of incorporating information such as the node device's "identity" and hashing power. A second pointer points to the previous milestone, or the genesis pointer if there is no previous milestone, following the traditional longest chain principle in case there is a fork. This pointer is required because the node device does not know whether it will turn out to be a milestone or not. In case where this block turns out to be a milestone, all the milestones need to be connected to form the Nakamoto chain. The last (third) pointer needs to point to another node device's recent regular block to enhance connectivity among peer chains. It is not desirable to point to relatively older blocks because their contribution to the connectivity is very limited. The reward mechanism in the present invention is configured to effectively eliminate any motivation to perform this action by the node devices. The structured DAG is illustrated in FIG. 2, where peer chains and the Nakamoto chain are highlighted.

After creating a block, the node device will just hash the block by tuning the nonce. If the hashing result exhibits a certain required pattern, e.g. leading 10 bits are 0, then this is a valid block. In some occasions, the hashing result exhibits a more difficult pattern, e.g. leading 15 bits are 0, then it is a milestone block. A block, regardless of its type, serves as a transaction container.

The milestone blocks form a Nakamoto chain, which plays a key role of reaching consensus. Whether a block is a milestone is only revealed when the mining process is finished and only determined by chance. No node device can devote its hashing power only for milestone blocks since the workflow for creating any block is the same.

By that design, it does not only scale up the capacity, it also completely decentralizes the milestone chain and helps multiple node devices reach consensus in the same way as how Nakamoto chain does. The latency is reduced since a block will be very soon confirmed by a chain of milestones. "confirm" described herein refers to a path which a milestone block reaches following the above-mentioned three pointers sequentially. Although smaller block yields smaller reward, smaller hashing effort is required. This greatly reduces the variability among miners' rewards, consequently miners do not need to rely on mining pools to stabilize their income.

As the capacity is scaled up, it becomes more likely that a transaction will be processed by more than one node device during a short time interval. Although a conflict among different miners/node devices can be resolved by consensus, having multiple blocks containing an identical transaction is a waste of capacity. Thus, a mechanism is needed to avoid this kind of conflict. The underlying principle is to "partition" all the transactions in the mem-pool to the node devices according to their relative hashing power. This requires the information of node devices' identity and hashing power, which is provided by the peer chain. A node device can only process a transaction if the hashing result of its most recent block concatenated with the transaction satisfies certain pattern, e.g., leading several bits are 0. Node devices according to certain embodiments of the present invention are always allowed to create 'empty' blocks even without transaction therein, and only earn the reward from creating blocks in the absence of any transaction fee. By carefully computing the parameters, the present method effectively reduces the chance of processing an identical transaction by multiple miners.

The present invention will be further described in detail below in conjunction with the accompanying drawings and specific embodiments, so the above described objects, features and advantages of the present invention will become more apparent and understood.

In the description of the embodiments of the present invention, it is to be understood that the terms "first" and "second" are used for descriptive purposes only, and are not to be construed as indicating or implying a relative importance or implicitly indicating the quantity of indicated technical features. Thus, features defining "first" and "second" may include one or more of the features either explicitly or implicitly. "Multiple" means two or more, unless specifically defined otherwise. The terms "including", "comprising", and the like are to be understood to be an open term, that is, "including/including but not limited to". The term "based on" is "based at least in part on." The term "an embodiment" means "at least one embodiment"; the term "another embodiment" means "at least one additional embodiment." Relevant definitions of other terms will be given in the description below.

Figure 1:
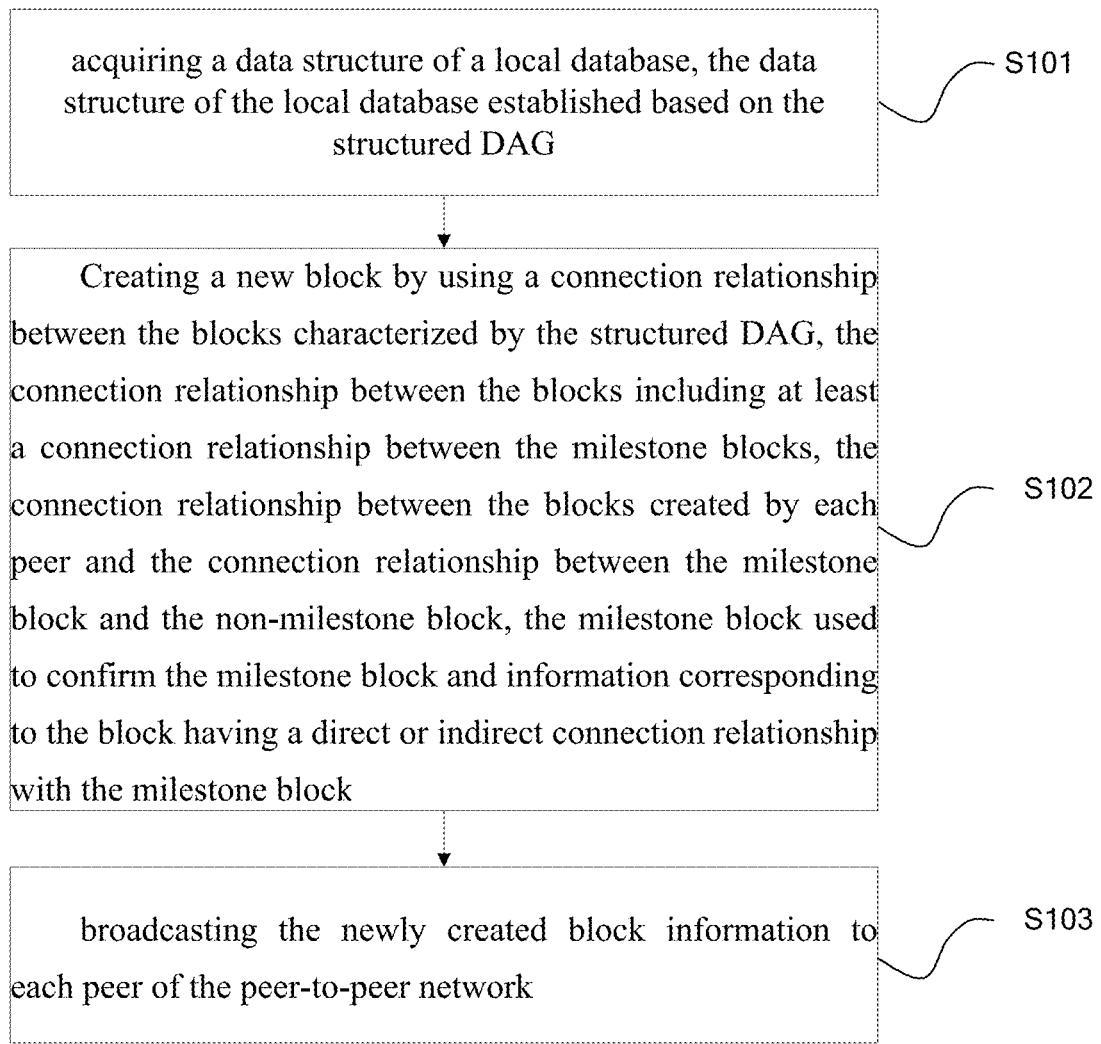
FIG. 1 is a flowchart depicting a method for creating blocks based on a structured DAG according to an embodiment of the present invention.

Referring to FIG. 1, a flowchart illustrating a method for creating blocks based on a structured directed acyclic graph according to an embodiment of the present invention is provided. One or more node devices in a peer-to-peer network are those executing the method in this embodiment. The method includes:

S101: acquiring a data structure of a local database by said node device(s), where the data structure of the local database is established based on the structured DAG;

S102: creating a new block by said node device(s) based on a connection relationship between blocks characterized by the structured DAG, where the connection relationship between the blocks includes at least a connection relationship between the milestone blocks, connection relationship between the blocks created by each of node devices and connection relationship between milestone block and non-milestone block, in which the milestone block is used to confirm information of the new milestone block and corresponding information of blocks directly or indirectly associated with the new milestone block;

S103: broadcasting newly created block information to each of the node devices of the peer-to-peer network.

In certain embodiments of the present invention, each of the node devices (or interchangeably referred to as "node") of the peer-to-peer network locally establishes a local database according to the received block information and based on the structured DAG. A data structure of the local database is therefore established based on the structured DAG. As shown in FIG. 2, it is a schematic diagram of a structured DAG provided by an embodiment of the present invention.

In certain embodiments of the present invention, the structured DAG includes at least a milestone chain formed by a plurality of milestone blocks connected together and a peer chain formed by connecting a plurality of blocks created by each of node devices, and each of the blocks in the peer chain points to at least one of the milestone blocks. Each of the milestone blocks is used to confirm the new milestone block and corresponding information of the blocks directly or indirectly associated with the new milestone block. The corresponding information of the blocks may include but not limited to, for example, transaction information of the blocks. In some embodiments, the transaction information included in a distributed ledger of each of the node devices is carried by the milestone block and the block(s) directly or indirectly associated therewith. In various embodiments of the present invention, the distributed ledger maintained locally by each of the node devices is also referred to as a local distributed ledger or a local ledger. In some embodiments, the structured DAG-characterized inter-block connection relationship further includes a connection relationship between one of the non-milestone blocks and other non-milestone block. Each block in the peer chain can also point to a non-milestone block. In an embodiment, the creating of a new block based on the connection relationship between the blocks characterized by the structured DAG includes: forming a new block information based on the connection relationship between the blocks characterized by the structured DAG, where the new block information includes at least transaction information selected from a transaction pool, a connection relationship between the new block and a block included in the structured DAG, and a nonce; and adjusting the nonce included in the new block information until the hash result of the new block information satisfies a first difficulty condition. The first difficulty condition is adjustable when needed. The new block information may further include information of the node device, such as a node device identity. Further, when the nonce included in the new block information is adjusted and it is determined that the hash result of the new block information satisfies a second difficulty condition, the new block is confirmed as a milestone block. The transaction information contained in the distributed ledger of each of the node devices is carried by the milestone block and the block directly or indirectly associated therewith. The second difficulty condition is adjustable when needed.

In an embodiment, the connection relationship between the new block and the block included in the structured DAG includes at least: a pointer of a newly created milestone block within the longest milestone block chain of the structured DAG to which the new block points; and a pointer of a newly created block within a peer chain of the structured DAG to which the new block points. Further, the connection relationship between the new block and the block included in the structured DAG further includes: the most recent block created by other node devices in the structured DAG to which the new block is pointed. It should be noted that when the node device selects the transaction information from the transaction pool, the node device can randomly select the transaction of interest. In order to avoid the risk of concentration of hashing power and not to process transactions with low fees, the allocation of transactions can be achieved in a certain way. For example, transactions in the transaction pool can be allocated based on the relative hashing power of each of the node devices.

The structured DAG and the block creation method according to the embodiments of the present invention are introduced below with reference to the examples and the accompanying drawings.

Among different applications, a graph can describe a data structure, with each "vertex" representing a basic unit of information, and each "edge" represents the relationship between two units. The present structured DAG provides a data structure of a distributed ledger that all node devices are intended to maintain in a distributed fashion. The embodiments of the present invention initially provide the structure of each element, namely a block, in the DAG.

As a basic unit of information, a block should at least contain a message which is an essential data such as transaction information of cryptocurrency applications, and a plurality of pointers to other blocks to position itself in the structured DAG. To ensure its integrity, the present invention requires a proof of work (PoW) for every block. Specifically, it is assumed that there is a random oracle which maps a string of arbitrary length to a unique identity. In practice, the present invention will use a reasonably good cryptographic hash function, e.g. SHA-256, as the random oracle for encrypting block information, which is marked as H(B) to represent identity of the block. When performing block integrity check, block check can be performed by verifying whether the block identity matches the hash calculation result.

In an embodiment, when creating a new block, the method may include: selecting an identity ID of the most recent block in the longest milestone chain in the current database and recording in the new block; selecting the identity ID of the most recent block in the peer chain of the current node device, and recording thereof in the new block; selecting another node device, selecting the identity ID of the most recent block in its peer chain and recording thereof in the new block; selecting a transaction in the current transaction pool and recording thereof in the new block; after that, trying different nonce in the new block until the hash result of the new block satisfies a first difficulty requirement.

The following is an example. In this example, such as block B, the block information of block B can be described by formula (1).

$$B=(\text{id}_{prev},\text{id}_{ms},\text{id}_{tip},\text{peer,nonce,message}), \quad (1)$$

where ($\text{id}_{prev},\text{id}_{ms},\text{id}_{tip}$) are the unique identities of each block in the structured DAG; peer is a node executing the method on this block, nonce is a solution to a cryptographic puzzle, and message represents transaction information. In addition, genesis O is defined as a special block that contains certain trusted setup information, i.e., genesis block, according to certain embodiments of the present invention.

The method according to certain embodiments of the present invention also contains Proof of Work. The node should tune the nonce until the hash of the block H(B) exhibits a certain pattern. It is assumed that the hash result H(B) is a string of zero-one bits and ". (H(B))" converts this string of bits to a number selected from [0,1]. Since H(·) is a random oracle, for any nonce value, ". (H(B))" will be uniformly distributed in interval [0,1] for any block a priori. In order to prove work, a node device needs to vary the nonce such that the hash of the block satisfies the difficulty requirement of the ordinary block, e.g., ". (H(B))"<d, where d is called the difficulty. The hash H(B) is also used as the identity of the block B.

Among all the blocks, the present invention allows a portion of them to be a special type called milestone. In an embodiment, if the nonce included in the new block information is adjusted and it is determined that the hash result of the new block information satisfies a second difficulty condition, the new block will be confirmed as a milestone block. For example, a block is a milestone block if ". (H(B))<pd", where p is the probability of a block being a milestone block. It is important to note that a node device has to specify all the parts including the three pointers, the transaction message, the node device and the nonce before working on it (computing the hash), and only finds out whether this block will be a milestone afterwards. In other words, a node device cannot determine whether they are working towards a milestone or a non-milestone block. A node device may continue to work on the block after obtaining a hash ". (H(B))" ∈[p·d, d) with the intension to make it a milestone block. However, devoting a node device's hashing power only for creating milestone blocks will not change the expected number of milestone blocks it is capable to create. Thus, working exclusively to become milestone blocks is not economically beneficial to all the node devices.

To describe the structure in a structured DAG according to certain embodiments of the present invention, the three pointers ($\text{id}_{prev},\text{id}_{ms},\text{id}_{tip}$) will be explained in more detail hereinafter.

In certain embodiments of the present invention, a chain formed by connecting blocks created by each of the node devices is called a Peer Chain. In block information, the pointer $\text{id}_{prev}$ is designed to point to the latest (the most recent) block that is mined by the same node device, or is the genesis block if the node device has not mined any blocks before. By this mechanism, blocks mined by the same node device are organized into a chain, namely the peer chain. Peer chain is designed to keep a simple structure in the structured DAG and mitigate the effect of lazy mining. It also provides valuable information including an estimate of the node device's hashing power and a record of the mining history. The head, defined to be the last block, of the peer chain can also be interpreted as a state of the node.

In certain embodiments of the present invention, a transaction scheme that utilizes the node device state is introduced. From a mathematical point of view, the following conditions should be satisfied according to the embodiments of the present invention:

$$B.\text{id}_{prev}=H(B') \Rightarrow \{B'.\text{peer}=B.\text{peer}\} \text{ or } \{B'=0\}. \quad (2)$$

It can be seen from formula (2) that the block in the peer chain corresponding to the node device points to the block created by the node device itself or to the genesis block. Preferably, the pointer $\text{id}_{prev}$ points to the most recent block mined by the same node device.

It is noted that such mathematical requirement cannot prevent malicious uses, such as forking (not appending to the node device's most recently mined block) and attacking (e.g. mining on another peer chain). In certain embodiments of the present invention, malicious node devices can only waste a little of the system capacity without affecting the consensus nor benefiting themselves.

To improve the connectivity among different peer chains, the embodiments use $\text{id}_{tip}$ to point to a non-milestone block of another node device. The genesis O is set to be default when no such block exists. Mathematically, $$B.\text{id}_{tip}=H(B_t) \Rightarrow \{B_t.\text{peer} \neq B.\text{peer}, H(B_t) \in [p \cdot d, d]\} \text{ or } \{B_t=0\}. \quad (3)$$

It should be noted that $\text{id}_{tip}$ points to ordinary block or genesis block created by another node device to improve the connectivity among node devices. It should be noted that, when the present invention is specifically implemented, a plurality of $\text{id}_{tip}$ may be included in formula (1). That is to say, a newly created block is defined to point to pointers of a plurality of ordinary blocks to improve connectivity among node devices.

A directed edge, namely block B points to $B_t$, plays a role of confirming all previous blocks like. Stronger connection leads to faster confirmations. Theoretically, there can be multiple such edges in a block. However, these edges have to be synchronized and stored by all node devices and therefore, more edges lead to higher overhead cost. In certain embodiments of the present invention, a milestone chain is embedded in DAG. The pointer $\text{id}_{ms}$ points to a milestone block $B_m$ or to the genesis O, and the hash result of the milestone block satisfies the second difficulty condition, i.e., $$B.\text{id}_{ms}=G(B_m) \Rightarrow \{H(B_m)<p \cdot d\} \text{ or } \{B_m=0\}. \quad (4)$$

By nature, a peer-to-peer network is efficient in synchronizing messages that are small and slow paced. However, a cryptocurrency system has to be efficient in throughput. Milestone is designed as a bridge between high throughput and stable synchronization. Each milestone is tied to a history that is non-reversible. Therefore, as long as the node devices reach consensus on all milestones, they reach consensus on the history. To achieve these objectives, all milestones are put in a chain. But as discussed, the type of a block is determined only after mining. Therefore, a link is introduced to refer to a milestone on all blocks.

Let $\mathcal{G}$ be a collection of blocks including the genesis O, such that each non-genesis block satisfies (2)-(4), and $$\forall B \in \mathcal{G}, H(B') = B.id_{key}, key \in \{prev, ms, tip\} \Rightarrow B' \in \mathcal{G} \quad (5)$$

In other words, all blocks pointed by $B \in \mathcal{G}$ are also in $\mathcal{G}$. Essentially, is a directed graph if blocks are regarded as vertices and pointers as directed edges. There exists a path from B to B', if starting at block B, following a consistently-directed sequence of edges to reach block B'. Such a graph is called acyclic, if for any block B in there is no directed path from B to itself.

A block is syntactically valid if the block's format satisfies (1) and its id matches the block. This is called the integrity check, verifying the block header. A DAG $\mathcal{G}$ is syntactically valid if any of its block is syntactically valid, and it is acyclic and satisfies (5). A block B is syntactically valid for the sDAG $\mathcal{G}$ if $\mathcal{G} \cup \{B\}$ is syntactically valid. A node device's first task is to make sure his local DAG is syntactically valid. Such a check avoids the system be flooded by invalid blocks.

In some embodiments, the milestone tree is essentially the tree occurs in blockchain with forks. Similarly, each node device's blocks also form a chain by $id_{prev}$. This could potentially generalize the present invention to credit-based applications. The "chain" of milestone blocks plays a role of connecting the "chains" of all node devices. The pointer $id_{tip}$ plays a role of further enhancing the connectivity of the DAG.

FIG. 2 provides an illustration of structured DAG of the embodiments. Peer 1, Peer 2, Peer 3, Peer 4, and Peer 5 are peers (nodes) in a peer-to-peer network. Each peer has its own peer chain. For example, in FIG. 2 and FIG. 3, several parallel chains respectively correspond to node chains of each peer. The black block represents the milestone block, and the chain composed of each milestone block is called the milestone chain. Block O is the genesis block.

A height of milestone blocks in a structured DAG is defined. The height of the genesis $\eta(O)=0$, and for a milestone block B, i.e., $H(B) < pd$, the height is defined as $$\eta(B) = \eta(B_m) + 1, \text{ where } H(B) < pd \text{ and } B.id_{ms} = B_m.id. \quad (6)$$

That is, if a condition that block B points to block $B_m$ and $H(B) < pd$, the height of B is the height of $B_m$ plus 1, where block B is milestone block.

The genesis and all milestone blocks in $\mathcal{G}$ form a tree where each milestone block's depth is its height. The leaf set of all milestone blocks is $$T_m(\mathcal{G}) = \{B_m \in \mathcal{G} : H(B_m) < pd \text{ and } \nexists B'_m \in \mathcal{G} \text{ s.t. } H(B'_m) < pd \text{ and } B'_m.id_{ms} = B_m.id\}. \quad (7)$$

For a milestone block $B_m$ in the leaf set with $\eta(Bm) = n$, following the pointers $id_{ms}$ the sequence of blocks is found.

$$B_{m,n} = B_m, B_{m,n-1}, B_{m,n-2}, \ldots, B_{m,1}, B_{m,0} = O, \quad (8)$$

such that $H(B_{m,k}) < pd$ and $B_{m,k}.id_{ms} = B_{m,k-1}.id$ for all $k=1, 2, \ldots, n$. Such a sequence is called as the milestone chain for block $B_m$. So, each block in the leaf set of all milestone blocks represent a milestone chain, with length being the height of that block. The height of the sDAG $\mathcal{G}$ (sDAG $\mathcal{G}$) is defined to be the length of the longest chain(s)

$$\eta(\mathcal{G}) = \max\{\eta(B) : B \in T_m(\mathcal{G})\}, \quad (9)$$

It is noted that there may exist multiple longest chains. To choose a longest chain, it needs to choose a block with the largest height in the leaf set. The nth milestone is defined to be block on the longest milestone chain with height n.

For any milestone block $B_m \in \mathcal{G}$, the structured DAG is defined to be confirmed by the milestone $B_m$, which is $$\mathcal{C}(B_m) = \{B \in \mathcal{G} : \text{there exits a path from } B \text{ to } B_m\} \cup \{B_m\}. \quad (10)$$

Formula (10) defines a set of blocks that have been confirmed by the milestone block $B_m$, which contains blocks that can be reached by a path from $B_m$. That is, the set of blocks confirmed by the milestone block includes the milestone block, and the block(s) that is/are directly or indirectly connected to the milestone block.

If $B'_m \varepsilon \mathcal{G}$ is the milestone or genesis that immediately proceeds $B_m$, i.e., $B_m.id_{ms} = H(B'_m)$, then the level set is defined as $$S(B_m, B'_m) = \mathcal{C}(B_m) \setminus \mathcal{C}(B'_m). \quad (11)$$

The structured DAG is collectively created and maintained in a distributed fashion by all peers over a peer-to-peer network following a protocol. Peers who follow this protocol are called honest and peers who do not are called malicious. In a decentralized system, each peer will have his own local DAG, which can be different from the local structured DAG of another peer due to network synchronization delay, malicious attack, etc. The objective is that all honest peers agree upon the same sDAG, and consequently the same set of information about the public ledger.

For a peer p, denote his local DAG by $\mathcal{G}_p$, which is evolving as blocks being created and received by this peer. All honest peers start their peer chains from the genesis block.

A specific embodiment of creating a block will now be described.

If a peer wants to create a block B, and makes it accepted by all other peers as part of their valid local DAG, the actions are as follows. A block is created to include a message, i.e., transaction information. So, the first thing the peer needs to do is to find a message such that is consistent with all messages in $\mathcal{G}_p$ and set B.mes=message.

First the peer needs to select a transaction. To be compatible with the distributed ledger building function, the input for this transaction should be one of the outputs in $\mathcal{C}(B_m)$, $B_m$ being the highest milestone in its valid local DAG.

Next, the peer prepares three pointers so that the block will be syntactically valid:

1. Pick the highest milestone $B_m$ in its valid local DAG and set $B.id_{ms} = H(B_m)$ Normally, $B_m$ is the most recent milestone block it knows (i.e. in $\mathcal{G}_p$). However, due to network synchronization, $B_m$ is not necessarily the most recent milestone block.

2. Pick the most recent block B' created by itself in $\mathcal{G}_p$ and set $B.id_{prev} = H(B_0)$ if no such B' exists, set $B.id_{prev} = H(O)$.

Note that block B' and B being consecutive blocks created by the same peer.

3. Define the tip set to be the set of regular blocks in the local DAG $\mathcal{G}_p$ which are not pointed by any blocks in $\mathcal{G}_p$ and not created by the peer itself. Randomly pick a block $B_t$ from the tip set and set $B.id_{tip} = H(B_t)$, if the tip set is $\{0\}$ or empty, then set $B.id_{tip} = H(O)$.

This means that the peer needs to find a block $B_t$ is a regular block created by some other peer.

Finally, the peer needs to broadcast B through a peer-to-peer network. By classical results in regular graphs, such a block (if syntactically valid) will reach to all honest peers, if each of them relay the block after confirming its validity, in O(log(n)) time in expectation, where n is the number of honest peers.

Figure 3:
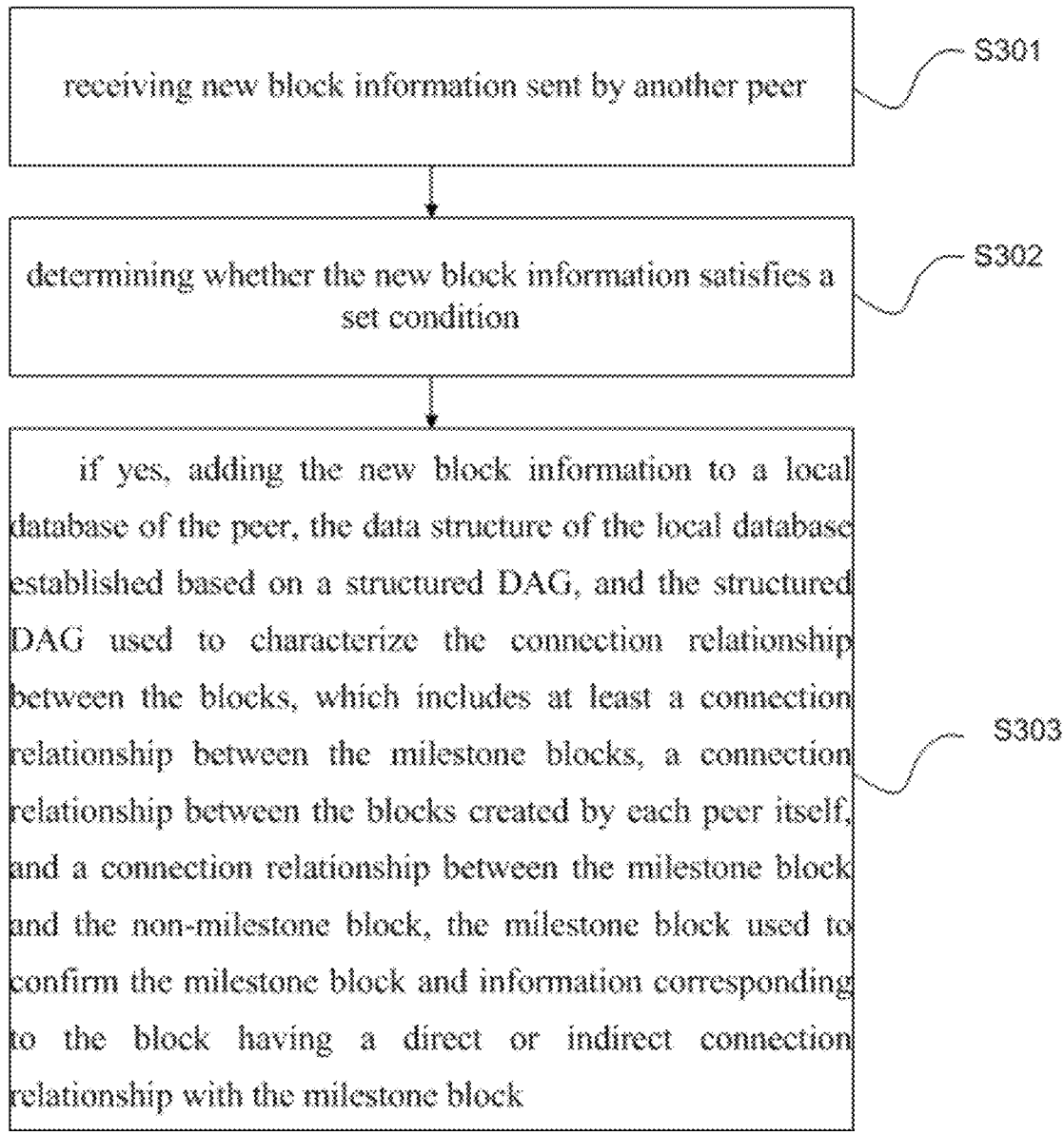
FIG. 3 is a flowchart depicting a method for adding blocks based on a structured DAG according to an embodiment of the present invention.

Referring to FIG. 3, a flowchart of a method for adding a block based on a structured DAG according to an embodiment of the present invention is applied to a peer in a peer-to-peer network, including:

S301. The peer receives new block information sent by a peer.

S302. The peer determines whether the new block information satisfies a set of conditions.

S303. If yes, the peer adds the new block information to a local database of the peer; the data structure of the local database is established based on a structured DAG, and the structured DAG is used to characterize the connection relationship between the blocks, which includes at least a connection relationship between the milestone blocks, a connection relationship between the blocks created by each peer itself, and a connection relationship between the milestone block and the non-milestone block. The milestone block is used to confirm the milestone block and information corresponding to the block having a direct or indirect connection relationship with the milestone block.

In some embodiments, the new block information includes at least transaction information selected from a transaction pool, a connection relationship between the new block and a block included in the structured DAG, and a nonce. The new block information may further include information of the peer, such as a peer identity.

In some embodiments, the connection relationship between the new block and the block included in the structured DAG includes at least: a pointer of a newly created milestone block in the longest milestone chain of the structured DAG to which the new block points; and a pointer of a newly created block in the peer chain in the structured DAG to which the new block points.

In some embodiments, the connection relationship between the new block and the block included in the structured DAG further includes: the new block points to a most recent block created by another peer in the structured DAG.

In some embodiments, determining whether the new block information satisfies a set of conditions includes determining whether the new block information satisfies a syntactical requirement; if yes, determining whether the hash result of the new block information satisfies the first difficulty condition. The first difficulty condition can be set as needed.

In some embodiments, the method further includes: determining whether the block pointed by the new block is in the local database; if not, requesting the block from the peer creating the block pointed by the new block.

In some embodiments, the method further includes: if the transaction information included in the new block information is determined to be the same as the first transaction information in the local transaction pool, removing the first transaction information from the local transaction pool. The local transaction pool includes transaction information to be processed that is not carried by the block. The first transaction information is any transaction information in the local transaction pool.

In some embodiments, the method further includes: determining whether the new block is a milestone block; if so, updating the local distributed ledger based on the milestone block and block information having direct or indirect connection with the milestone block.

The following is an example. The peer can set the listening thread as follows. When receiving the new block, it can include the following processes:

A. Verifying whether the new block satisfies the difficulty requirements. If not, skip the steps and ignore the block.

When performing step A, the peer can be understood as a string by listening to the block received by the thread. When the peer receives a new block, it first checks whether the syntax is valid, that is, whether conforms to the definition of the block; if its syntax is valid, performs hash on it and checks whether it is smaller than the difficulty coefficient. Blocks with invalid syntax do not have to be hashed.

B. Whether the blocks pointed by the new block pointer are in the database, if not, requesting the missing block from the peer-to-peer network.

C. Adding a new block to the database, and update the peer chain of the peer to which the block belongs.

D. Checking if the new block satisfies the milestone difficulty requirement.

E. If yes, sending the new block and all blocks associated therewith directly or indirectly by the new block to the offline verification algorithm and updating the milestone chain in the data. The offline verification algorithm can be executed by the peer.

F. Removing the transaction from the transaction pool if the transaction contained in the new block is in the transaction pool.

For example, if the peer has not received blocks pointed by B due to synchronization issue, it should query for the missing blocks from its peers and execute the verification as if B was received after those blocks.

Upon receiving a new block B, the peer first checks if B is syntactically valid for G. If so, update by letting $$\mathcal{C} := \mathcal{C} \cup \{B\}$$

That is, the newly received block is added to the local DAG and relayed to its peers; otherwise discard it.

The mem-pool is defined as the buffer which holds all pending transactions to be processed. If B contains a transaction that is in the peer's mem-pool, the peer removes the transaction from its mem-pool.

No further verification is needed. The only concern is whether B is a forked milestone or not. In other words, what needs to be considered is what kind of block it is. If B is a non-milestone, do nothing. If B is a milestone, it is required to compare the height of $\mathcal{G}_p$ with $\eta(B)$. If $\eta(B) > \eta(\mathcal{G}_p)$, then set $\mathcal{G}_p := \mathcal{C}(B)$.

This means a major update of the $\mathcal{G}_p$ since the peer need to switch from the current milestone chain in the local valid DAG to the longest milestone chain in the local DAG. Here is the solution for the occurrence of milestone block forks. If the forked portion is higher than the original milestone chain, the peer will update its own local DAG to all blocks confirmed by the forked milestone block.

Figure 4:
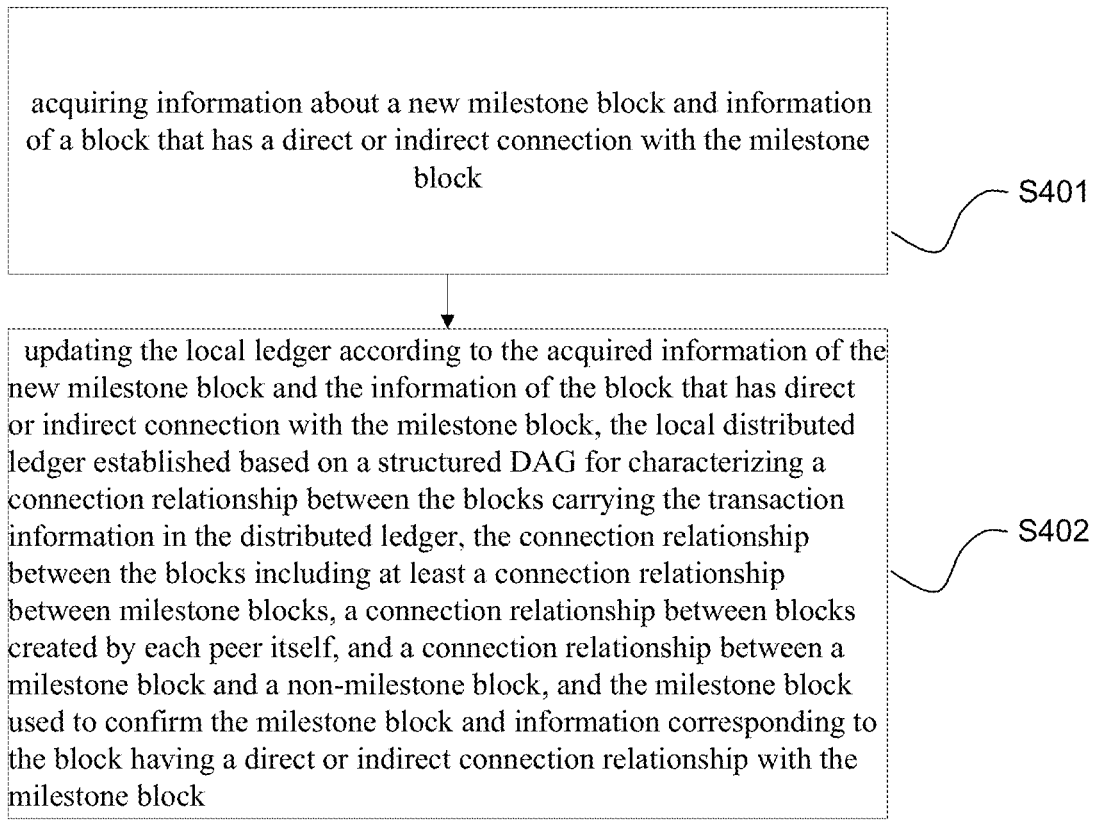
FIG. 4 is a flowchart depicting a method for establishing a distributed ledger according to an embodiment of the present invention.

FIG. 4 is a flowchart of a method for establishing a distributed ledger according to an embodiment of the present invention. The method may be applied to a peer and includes:

S401. The peer acquires information about a new milestone block and information of a block that has a direct or indirect connection with the milestone block.

S402. The peer updates the local distributed ledger according to the acquired information of the new milestone block and the information of the block that has direct or indirect connection with the milestone block.

Wherein the local distributed ledger is established based on a structured DAG, and the structured DAG is used to represent a connection relationship between the blocks carrying the transaction information in the distributed ledger, and the connection relationship between the blocks includes at least a connection relationship between milestone blocks, a connection relationship between blocks created by each peer itself, and a connection relationship between a milestone block and a non-milestone block; the milestone block is used to confirm the milestone block and information corresponding to the block having a direct or indirect connection relationship with the milestone block. The connection relationship between the blocks also includes a connection relationship between the non-milestone block and the non-milestone block.

In some embodiments, the updating the local distributed ledger according to the acquired new milestone block information and the block information having direct or indirect connection with the milestone block include: starting from the new milestone block, traversing block information that has direct or indirect connection with the milestone block; determining whether the transaction information corresponding to the block conflicts with the local distributed ledger; if not, adding the transaction information to the local distributed ledger; otherwise, ignore the transaction information.

In some embodiments, starting from the new milestone block, traversing the block information having direct or indirect connection with the milestone block includes: using the depth-first algorithm, the breadth-first algorithm, or other algorithms capable of uniquely determining the order of the blocks to traverse block information that has direct or indirect connections to the milestone block.

In some embodiments, the method further includes: determining whether the pointer of the block pointing to the peer chain block correctly points to the most recent block of the peer chain; if yes, increasing the reward of the peer; if not, the reward of the peer is not updated.

In a specific implementation, the peer may input information of a milestone block, a set of blocks that are "confirmed" by the milestone, and a current ledger history. The milestone block "confirms" an ordinary block means that starting from the milestone block the ordinary block may be reached along a directed path. Starting from milestone, all blocks are traversed depth-first or breadth-first (or any algorithm with unique ordering) in the order of "present peer chain pointer" and "other peer chain pointers". For each block, the following algorithm is performed: check whether the transaction in the block conflicts with the current ledger, and whether the "present peer chain pointer" of the block correctly points to the most recent block of the corresponding peer chain: (1) if there is no conflict, the peer chain is correct, and the transaction is added to the ledger history, current peer reward increase (fixed increment+transaction fee); (2) if there is conflict, the peer chain is correct, skip the transaction, the current peer reward increases (fixed increment); (3) if there is no conflict, the peer chain is incorrect, the transaction is added to the ledger history, and the peer reward is not updated; (4) if there is conflict, the peer chain is incorrect, the transaction is skipped, and the peer reward is not updated. The method for determining whether the "present peer chain pointer" of the block correctly points to the most recent block of the corresponding peer chain is if the block pointed by $id_{prev}$ of the block has been pointed by $id_{prev}$ of another block, it is incorrect; otherwise, it is correct.

The transaction distribution and how to construct a distributed ledger of the embodiment of the present invention will be described in detail below with reference to examples.

In reward scheme, it is aimed to incentive peers to include the most recent milestone and select the tip of another peer. The present reward scheme works as follows. If a peer mines a regular block, it gets 98% of the sum of a dynamic reward plus the transactions. If a peer mines a milestone block, it gets a fixed reward plus the transaction fee, and plus 2% of all the blocks that the milestone block confirms. Milestone blocks that lose in a fork competition are treated as regular blocks. The dynamic reward of a regular block is tuned such that the total coins distributed to regular blocks per unit time is fixed. The reward scheme is summarized in the following table:

TABLE 1

Reward Scheme

| Scenario | Block | Transaction | Reward |
|---|---|---|---|
| 1 | Regular, Valid | Valid | 98%(dynamic + Tx fee) |
| 2 | Regular, Valid | Invalid | 98% dynamic |
| 3 | Peer fork | Valid | None |
| 4 | Peer fork | Invalid | None |
| 5 | Milestone block | Valid | fix + Tx fee + 2%(total confirmed reward) |
| 6 | Milestone block | Invalid | fix + 2%(total confirmed reward) |
| 7 | Other | | None |

Different from Bitcoin, the present reward is calculated offline based on the structured DAG. This mechanism enables us to assign regular blocks and milestone blocks different rewards. As mentions, these blocks are treated the same a priori. The present reward is assigned only if the block is already published. To make this mechanism work, a special type of transaction, Registration, is added. A Registration first claims the cumulated reward by putting it into an output and then commit a new address where the reward should be sent from now on.

Now the possibility of attacking a peer chain is described: adding blocks to the peer chain of another peer. Suppose Alice is trying to publish a block on Bob's peer chain. Alice cannot publish a registration block because it requires Bob's private key to do so. Now consider the case when Alice mines a block to Bob's peer chain. If Alice does not publish the block, it is very likely that Bob mines a block and gets confirmed by the next milestone, making Alice's block pure waste of hashing power, regardless of whether the transaction inside is valid or not. In mining in a chain structure by keeping the head of all other peers' chain as a state of the peers. If a malicious peer violates the protocol and forks its own peer chain, other peers will notice that the malicious peer is trying to update a peer state that is already updated. The block is then considered invalid. In case of a Byzantine attack, where a malicious peer sends different forks to different honest peers, the conflict is resolved by milestone chain. In fact, the only concern of us is that Alice reduces Bob's reward by letting milestones confirm the fork that Alice created on Bob's Chain. Note that Alice does not benefit from the attack. And because all peers will try to include as much reward as possible, they tend to include the chain that contains more reward between Bob's own chain, and the one Alice created on Bob's Chain. To sum up, the attack is possible but not likely to be successful, and not at all profitable.

Now how to build the Public Ledger is introduced.

Now consider a malicious peer, or user who tries to double spend. The malicious player publishes transaction A and transaction B that try to spend the same output at the same time. And it is possible that both A and B enter the DAG. Then consider a malicious peer that forks its own peer chain and try to double claim its reward. The peer sends one fork to part of the honest peers and the other fork to the rest. Again, by the present protocol, both forks may enter the DAG.

Both scenarios lead to a DAG that is not a reasonable Ledger. Therefore, a method is needed that maps a DAG to a reasonable distributed Ledger. That means, the method needs to eliminate double spending, double claiming, and other form of attacks on the ledger. We start by defining a reasonable distributed ledger.

A ledger is an ordered list of transactions. Further, a ledger is reasonable if
1. Every regular transaction is valid based on the transaction history that precedes it, and
2. The output amount of every registration transaction matches the reward of the corresponding address according to the transactions that precedes it.

The validity of regular transactions is self-evident. Condition 2 has two implications. Firstly, if a valid transaction on a peer fork is still valid. Secondly, no reward on the peer forks can be claimed.

A ledger building function $V: \mathcal{C} \rightarrow \mathcal{L}$ is provided that maps any syntactically valid structured DAG to a valid ledger of transactions. A ledger contains an ordered set of transactions, each of which is valid based on the ledger composed of transactions that precede it.

The present ledger building function V takes the last milestone of $\mathcal{G}$ milestone as input. And then starting from the earliest milestone, V performs a depth first search on block B in the order of $\{id_{prev}, id_{tip}\}$ For each block B, V first checks if the transaction Tx in B is valid. If Tx, either a normal transaction or a registration transaction, is valid, L is updated by letting $\mathcal{L} \cup Tx \rightarrow \mathcal{L}$ and update the reward mapping $\mathcal{R}$ by letting $\mathcal{R}$(Tx.adress)+B.reward$\rightarrow \mathcal{R}$(Tx.address). Further, if the transaction is a valid registration transaction, $\mathcal{R}$ is updated by removing corresponding reward record. It is obvious that the present method results in a valid public ledger.

For the foregoing method embodiments, for the sake of simplicity of description, they are all expressed as a series of action combinations, but those skilled in the art should understand that the embodiments of the present invention are not limited by the described action sequence, because in the embodiments of the present invention, some steps may be performed in other sequences or at the same time. Secondly, those skilled in the art should also know that the foregoing method embodiments are all preferred embodiments, and the actions and modules involved are not necessary in the embodiments of the present invention.

Through the description of the foregoing embodiments, the embodiments of the present invention can reach a large-scale consensus through the milestone block through the structured DAG-based block creation, addition, and distributed ledger establishment method. Since all blocks will be confirmed by the milestone block, a large-scale consensus is achieved on the premise of ensuring security, and the connectivity and network capacity of the network are enhanced.

In addition, the delay is shortened because the transactions carried by the block can be confirmed quickly. In the embodiment of the present invention, due to the structured DAG structure, the connectivity between the blocks is stronger than the linear structure of the traditional blockchain, and a technical effect is to shorten the time when the block is confirmed.

In addition, in the embodiments, all broadcasted blocks that satisfy the syntactical rules and the transaction assignment will be recorded in the final DAG, and with a sufficient queue size in the mem-pool transactions are being processed at a rate no less than the arrival rate, thus the throughput rate of blocks containing transactions is essentially limited merely by the physical condition of the communication network. The method of the present invention effectively increases throughout.

The embodiment also provides a storage medium on which a program for executing the above method is recorded. The storage medium includes any mechanism configured to store or transfer information in a form readable by a computer (as exemplified by a computer). For example, storage media includes read only memory (ROM), random access memory (RAM), magnetic disk storage media, optical storage media, flash storage media, electrical, optical, acoustic, or other forms of propagation signals (e.g., carrier, infrared) Signals, digital signals, etc.).

Figure 5:
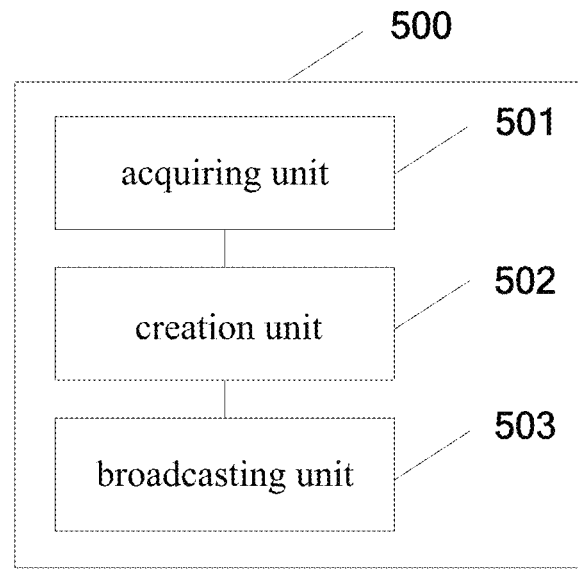
FIG. 5 is a schematic structural diagram of a block creation apparatus based on a structured DAG according to an embodiment of the present invention.

Referring to FIG. 5, it is a schematic structural diagram of an embodiment of a block creation apparatus based on a structured DAG according to the present invention. The apparatus 500 includes:
an acquiring unit 501 for acquiring a data structure of a local database, and the data structure of the local database is established based on the structured DAG;
a creation unit 502 for creating a new block by using a connection relationship between the blocks characterized by the structured DAG; the connection relationship between the blocks includes at least a connection relationship between the milestone blocks, the connection relationship between the blocks created by each peer and the connection relationship between the milestone block and the non-milestone block; the milestone block is used to confirm the milestone block and information corresponding to the block having a direct or indirect connection relationship with the milestone block; and
a broadcasting unit 502 for broadcasting the newly created block information to each peer of the peer-to-peer network.

In some embodiments, the structured DAG acquired by the acquiring unit includes at least a milestone chain connected by each milestone block and a peer chain connected by the blocks created by each peer itself; and each block in the peer chain points to at least one milestone block.

In some embodiments, the creation unit includes:
a building unit for constructing new block information by using a connection relationship between the blocks characterized by the structured DAG, the new block information including at least transaction information selected from a transaction pool, a connection relationship between the new block and blocks included in the DAG, and a nonce; and
an adjusting unit for adjusting a nonce included in the new block information until a hash result of the new block information satisfies a first difficulty condition.

In some embodiments, the building unit uses the following information to construct the new block information: a pointer of a newly created milestone block in the longest milestone chain of the structured DAG to which the new block points; and a pointer of a newly created block in the peer chain in the structured DAG to which the new block points.

In some embodiments, the building unit is further configured to use the following information to construct new block information: the new block points to the most recent block in the structured DAG that is not pointed to by other blocks and is created by other peers.

In some embodiments, the apparatus further includes:
a confirming unit for confirming that the new block is a milestone block when adjusting a nonce included in the new block information and determining that a hash result of the new block information satisfies a second difficulty condition.

In some embodiments, the information included in the distributed ledger of each peer is carried by the milestone block and a block directly or indirectly connected to the milestone block.

Figure 6:
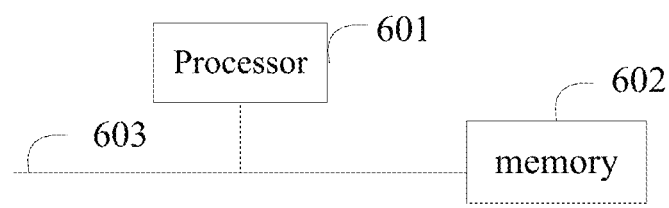
FIG. 6 is a schematic structural diagram of a block creation apparatus based on a structured DAG according to an embodiment of the present invention.

FIG. 6 is a schematic structural diagram of an embodiment of a block creation apparatus based on a structured DAG according to the present invention. A structured DAG-based block creation apparatus includes at least one processor 601 (e.g., a CPU), a memory 602, and at least one communication bus 603 for enabling connection communication between the apparatuses. The processor 601 is configured to execute executable modules, such as computer programs, stored in the memory 502. The memory 602 may include a high-speed random access memory (RAM), and may also include a non-volatile memory such as at least one disk memory. One or more programs are stored in the memory and are configured to execute the structured DAG based block creation method as illustrated in FIG. 1 by one or more processors 601.

Figure 7:
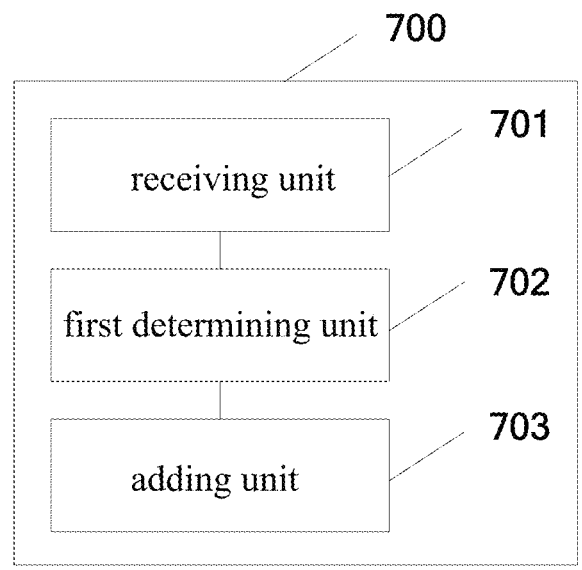
FIG. 7 is a schematic structural diagram of a block adding apparatus based on a structured DAG according to an embodiment of the present invention.

FIG. 7 is a schematic structural diagram of an embodiment of a block adding apparatus based on a structured DAG according to the present invention. The apparatus 700 includes:
a receiving unit 701 for receiving new block information sent by another peer;
a first determining unit 702 for determining whether the new block information satisfies a set of conditions; and
an adding unit 703 for, if yes, adding the new block information to a local database of the peer; the data structure of the local database is established based on the structured DAG for characterizing a connection relationship between the blocks, the connection relationship between the blocks includes at least a connection relationship between the milestone blocks, the connection relationship between the blocks created by each peer and the connection relationship between the milestone block and the non-milestone block; and the milestone block is used to confirm the milestone block and information corresponding to the block having a direct or indirect connection relationship with the milestone block.

In some embodiments, the new block information includes at least transaction information selected from a transaction pool, a connection relationship between the new block and a block included in the structured DAG, and a nonce.

In some embodiments, the connection relationship between the new block and the block included in the structured DAG includes at least:
a pointer of a newly created milestone block in the longest milestone chain of the structured DAG to which the new block points; and
a pointer of a newly created block in the peer chain in the structured DAG to which the new block points.

In some embodiments, the connection relationship between the new block and the block included in the structured DAG further includes:
the new block points to a most recent block created by another peer and not pointed by other peers in the structured DAG.

In some embodiments, the first determining unit is specifically used for:
determining whether the new block information satisfies a syntactical requirement; if yes, determining whether the hash result of the new block information satisfies the first difficulty condition; if yes, determining that the new block information satisfies the set of conditions.

In some embodiments, the apparatus further includes:
a second determining unit for determining whether the block pointed by the new block is in a local database; and
a requesting unit for, if not, requesting the block from the peer creating the block pointed by the new block.

In some embodiments, the apparatus further includes:
a removing unit for removing the first transaction information in the local transaction pool if the transaction information included in the new block information is identical to the first transaction information in the local transaction pool; wherein the local transaction pool contains transaction information to be processed that is not carried by the block.

In some embodiments, the apparatus further includes:
a third determining unit for determining whether the new block is a milestone block; and
an update unit for updating the local distributed ledger based on the milestone block and the block information having direct or indirect connection with the milestone block.

Figure 8:
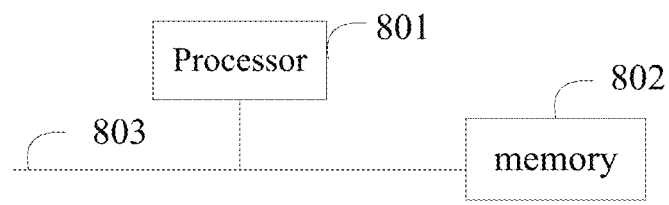
FIG. 8 is a schematic structural diagram of a block adding apparatus based on a structured DAG according to an embodiment of the present invention.

Referring to FIG. 8, it is a schematic structural diagram of an embodiment of a block adding apparatus based on a structured DAG according to the present invention. A structured DAG-based block adding apparatus includes at least one processor 801 (e.g., a CPU), a memory 802, and at least one communication bus 803 for implementing connection communication between the devices. The processor 801 is configured to execute executable modules, such as computer programs, stored in the memory 802. The memory 802 may include a high-speed random access memory (RAM), and may also include a non-volatile memory such as at least one disk memory. One or more programs are stored in the memory and are configured to execute the structured DAG based block addition method as illustrated in FIG. 3 by one or more processors 801.

Figure 9:
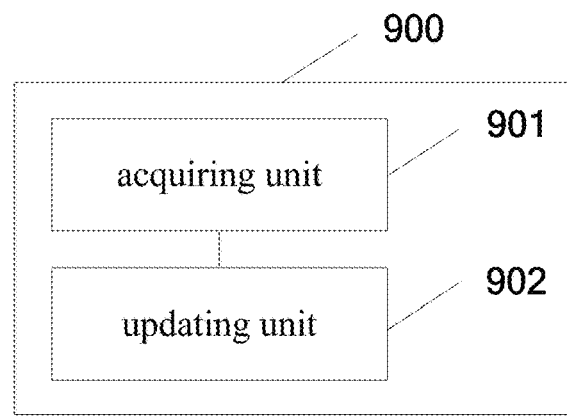
FIG. 9 is a schematic structural diagram of a distributed ledger establishing apparatus according to an embodiment of the present invention.

FIG. 9 is a schematic structural diagram of an embodiment of a distributed ledger establishing apparatus according to the present invention. The apparatus 900 includes:
an obtaining unit 901 for acquiring new milestone block information and block information that has direct or indirect connection with the milestone block; and
an updating unit 902 for updating the local distributed ledger according to the acquired information of the new milestone block and information of the block having a direct or indirect connection relationship with the milestone; the local distributed ledger is established based on the structured DAG for characterizing a connection relationship between the blocks carrying transaction information in the distributed ledger, the connection relationship between the blocks includes at least a connection relationship between the milestone blocks, the connection relationship between the blocks created by each peer and the connection relationship between the milestone block and the non-milestone block; and the milestone block is used to confirm the milestone block and information corresponding to the block having a direct or indirect connection relationship with the milestone block.

In some embodiments, the updating unit 902 includes:
a traversing unit for traversing the block information having direct or indirect connection relationship to the milestone block starting from the new milestone block;
a first determining unit for determining whether the transaction information corresponding to the block conflicts with the local distributed ledger; and
a transaction adding unit for adding the transaction information to the local distributed ledger if there is no conflict and ignoring the transaction information if there is conflict.

In some embodiments, the traversal unit is specifically configured to:
starting from the new milestone block, using depth-first algorithm or breadth-first algorithm to traverse the block information having direct or indirect connection relationship to the milestone block.

In some embodiments, the apparatus further includes:
a second determining unit for determining whether the pointer of the block pointing to the peer chain block correctly points to the most recent block of the peer chain; and
a reward processing unit for, if yes, increasing a reward of the peer; if not, updating the reward of the peer.

Figure 10:
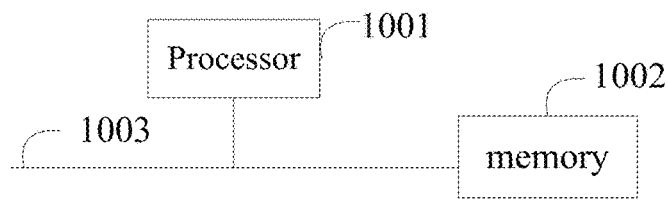
FIG. 10 is a schematic structural diagram of a distributed ledger establishing apparatus according to an embodiment of the present invention.

FIG. 10 is a schematic structural diagram of an embodiment of a distributed ledger establishing apparatus according to the present invention. A distributed ledger establishing apparatus comprising at least one processor 1001 (e.g., a CPU), a memory 1002, and at least one communication bus 1003 for enabling connection communication between the apparatuses. The processor 1001 is configured to execute executable modules, such as computer programs, stored in the memory 1002. The memory 1002 may include a high-speed random access memory (RAM), and may also include a non-volatile memory such as at least one disk memory. One or more programs are stored in the memory and are configured to execute the distributed ledger creation method as illustrated in FIG. 4 by one or more processors 1001.

Figure 11:
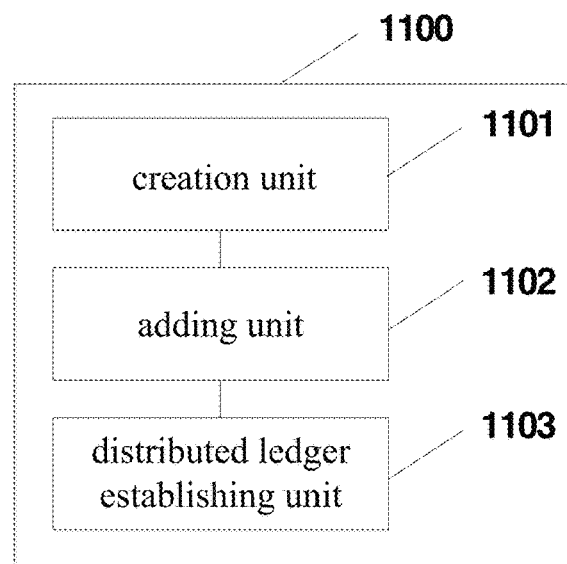
FIG. 11 is a schematic structural diagram of a structured DAG-based block data processing apparatus according to an embodiment of the present invention.

FIG. 11 is a schematic structural diagram of an embodiment of a DAG-based block data processing apparatus according to the present invention. The apparatus 1100 includes:
a creation module 1102 for acquiring a data structure of a local database, and the data structure of the local database is established based on the structured DAG; creating a new block by using a connection relationship between the blocks characterized by the structured DAG; the connection relationship between the blocks includes at least a connection relationship between the milestone blocks, the connection relationship between the blocks created by each peer and the connection relationship between the milestone block and the non-milestone block; the milestone block is used to confirm the milestone block and information corresponding to the block having a direct or indirect connection relationship with the milestone block; and broadcasting the newly created block information to each peer of the peer-to-peer network;

an adding module 1102 for receiving new block information sent by a peer; determining whether the new block information satisfies a set of conditions, and if yes, adding the new block information to a local database of the peer; the data structure of the local database is established based on the structured DAG for characterizing a connection relationship between the blocks, the connection relationship between the blocks includes at least a connection relationship between the milestone blocks, the connection relationship between the blocks created by each peer and the connection relationship between the milestone block and the non-milestone block; and the milestone block is used to confirm the milestone block and information corresponding to the block having a direct or indirect connection relationship with the milestone block; and a distributed ledger establishing module 1103 for acquiring information of a new milestone block and information of a block having direct or indirect connection with the milestone block; and updating the local distributed ledger according to the acquired information of the new milestone block and information of the block having a direct or indirect connection relationship with the milestone; the local distributed ledger is established based on the structured DAG for characterizing a connection relationship between the blocks carrying transaction information in the distributed ledger, the connection relationship between the blocks includes at least a connection relationship between the milestone blocks, the connection relationship between the blocks created by each peer and the connection relationship between the milestone block and the non-milestone block; and the milestone block is used to confirm the milestone block and information corresponding to the block having a direct or indirect connection relationship with the milestone block.

It should be noted that the foregoing apparatus embodiments are preferred embodiments, and the involved units and modules are not necessarily required in the embodiments of the present invention.

The various embodiments in the present specification are described in a progressive manner, and each embodiment focuses on differences from other embodiments, and the same similar parts between the various embodiments can be referred to each other. For the apparatus embodiment of the present invention, since it is basically similar to the method embodiment, the description is relatively simple, and the relevant parts can be referred to the description of the method embodiment. The apparatus and various embodiments thereof described hereinabove are merely illustrative, and the modules/units described as separate components may or may not be physically separated, and may be located in one place or distributed over multiple network elements. Some or all of the modules may be selected according to actual needs to achieve the purpose of the solution of the embodiment. Those of ordinary skill in the art can understand and implement without any creative effort.

The invention claimed is:
1. A method for creating blocks of a blockchain based on a structured directed acyclic graph (DAG) executed by node devices in a peer-to-peer blockchain network comprising:
acquiring a data structure of a local database being established based on the structured DAG;

creating a new block based on a connection relationship between blocks characterized by the structured DAG, the connection relationship between the blocks including at least a connection relationship between milestone blocks, connection relationship between the blocks created by each of the node devices and connection relationship between the milestone blocks and non-milestone block, the milestone blocks being used to confirm information of the new block and blocks directly or indirectly associated therewith; and broadcasting information of a newly created block to each of the node devices of the peer-to-peer blockchain network, wherein the creating of the new block based on the connection relationship between the blocks characterized by the structured DAG comprises:

forming a new block information based on the connection relationship between the blocks characterized by the structured DAG, wherein the new block information comprises at least transaction information selected from a transaction pool, a connection relationship between the new block and a block included in the structured DAG, and a nonce:

adjusting the nonce included in the new block information until a hash result of the new block information satisfies a first difficulty condition; and when the nonce included in the new block information being adjusted and the hash result of the new block information being determined to satisfy a second difficulty condition, the new block being confirmed as a milestone block.

2. The method of claim 1, wherein the structured DAG includes at least a milestone chain formed by a plurality of the milestone blocks connected together, and a peer chain formed by connecting the blocks created by each of the node devices, and each of the blocks in the peer chain points to at least one of the milestone blocks.

3. The method of claim 1, wherein the connection relationship between the new block and the block included in the structured DAG comprises:

a pointer of a newly created milestone block in the longest milestone chain of the structured DAG to which the new block points;

a pointer of a newly created block in the peer chain of the structured DAG to which the new block points;

the most recent block created by other node devices in the structured DAG to which the pointer of the new block points.

4. A method for adding blocks of a blockchain based on a structured directed acyclic graph (DAG) executed by node devices in a peer-to-peer blockchain network comprising:

receiving new block information sent by one of the node devices;

determining whether the new block information satisfies a set of conditions; and if the set of conditions is satisfied, adding the new block information to a local database of the node device, a data structure of the local database being established based on the structured DAG, and the structured DAG being used to characterize connection relationship between blocks, and the connection relationship between the blocks including at least a connection relationship between milestone blocks, connection relationship between the blocks created by each of the node devices and connection relationship between the milestone blocks and non-milestone blocks, the milestone blocks being used to confirm information of the new block and corresponding information of blocks directly or indirectly associated therewith, wherein the determining whether the new block information satisfies the set of conditions comprises:

determining whether the new block information satisfies a syntactical requirement;

if yes, determining whether the hash result of the new block information satisfies a first difficulty condition; and if yes, determining that the new block information satisfies the set of conditions; and determining whether the block pointed by the new block is in the local database;

if not, requesting the block from the node device creating the block pointed by the pointer of the new block;

if the transaction information included in the new block information is determined to be identical to a first transaction information in the local transaction pool, removing the first transaction information from the local transaction pool, wherein the local transaction pool includes transaction information to be processed that is not carried by the block; and determining whether the new block is a milestone block;

if so, updating a local distributed ledger based on the information of the milestone block and blocks directly or indirectly associated with the milestone block.

5. The method of claim 4, wherein the new block information includes at least transaction information selected from a transaction pool, a connection relationship between the new block and a block included in the structured DAG, and a nonce, and wherein the connection relationship between the new block and the block included in the structured DAG includes at least:

a pointer of a newly created milestone block in the milestone chain of the structured DAG which is longest in the structured DAG and to which the new block points;

a pointer of a newly created block in a peer chain in the structured DAG to which the new block points; and the most recent block created by other node devices in the structured DAG to which the new block points.

6. A method for building a distributed ledger of a blockchain, comprising:

acquiring information of a new milestone block and blocks directly or indirectly associated therewith; and updating a local distributed ledger according to the acquired information of the new milestone block and blocks directly or indirectly associated therewith to obtain an updated local distributed ledger being built based on a structured DAG, the structured DAG being used to characterize connection relationship between the blocks carrying a transaction information in the updated local distributed ledger, the connection relationship between the blocks including at least a connection relationship between milestone blocks, connection relationship between the blocks created by each of the node devices and connection relationship between the milestone blocks and non-milestone blocks, the milestone blocks being used to confirm information of the new milestone block and corresponding information of blocks directly or indirectly associated therewith, wherein the updating of the local distributed ledger according to the acquired information of the new milestone block and blocks directly or indirectly associated therewith comprises:
    starting from the new milestone block, traversing information of the blocks directly or indirectly associated with the milestone blocks;
    determining whether the transaction information corresponding to the block conflicts with the updated local distributed ledger;
    if not, adding the transaction information to the updated local distributed ledger;
    otherwise, ignoring the transaction information;
wherein the starting from the new milestone block, traversing information of blocks directly or indirectly associated with the milestone blocks comprises:
    starting from the new milestone block, using depth-first algorithm or breadth-first algorithm to traverse information of blocks directly or indirectly associated with the milestone blocks; and
    determining whether a pointer of the block correctly points to a block of a peer chain which is the most recent block of the peer chain;
    if yes, increasing value awarded to the corresponding node device;
    if not, the value awarded to the corresponding node device remaining unchanged.

7. An apparatus for creating blocks of a blockchain based on a structured directed acyclic graph (DAG) according to the method of claim 1, the apparatus comprising:
    a memory and a processor, wherein the memory stores machine-executable instructions and the processor reads and executes the machine-executable instructions;
    an acquiring unit, stored in the memory and executed by the processor, configured to perform the acquiring the data structure;
    a creation unit, stored in the memory and executed by the processor, configured to perform the creating the new block; and
    a broadcasting unit, stored in the memory and executed by the processor, configured to perform the broadcasting the information.

8. The apparatus of claim 7, wherein the data structure of the local database based on the structured DAG acquired by the acquiring unit includes at least a milestone chain formed by a plurality of milestone blocks connected together and a peer chain formed by connecting the blocks created by each peer itself, and
    wherein each of the blocks in the peer chain points to at least one of the milestone blocks,
    wherein the creation unit comprises:
        a building unit, stored in the memory and executed by the processor, configured to perform the forming the new block information; and
        an adjusting unit, stored in the memory and executed by the processor, configured to perform the adjusting the nonce;
    wherein the building unit uses the following information to form the new block information:
        a pointer of a newly created milestone block in the longest milestone chain of the structured DAG to which the new block points; and
        a pointer of a newly created block in the peer chain in the structured DAG to which the new block points,
    wherein the building unit further uses the following information to construct new block information: the new block points to a most recent block created by another peer in the structured DAG, and
    wherein the apparatus further comprises:
        a confirming unit, stored in the memory and executed by the processor, configured to perform confirming that the new block is a milestone block when adjusting the nonce included in the new block information and determining that a hash result of the new block information satisfies a second difficulty condition,
    wherein the information included in the distributed ledger of each node device is carried by the milestone block and a block directly or indirectly connected to the milestone block.

9. An apparatus for adding blocks of a blockchain based on a structured directed acyclic graph (DAG) according to the method of claim 4, the apparatus comprising:
    a memory and a processor, wherein the memory stores machine-executable instructions and the processor reads and executes the machine-executable instructions;
    a receiving unit, stored in the memory and executed by the processor, configured to perform the receiving the new block information;
    a first determining unit, stored in the memory and executed by the processor, configured to perform the determining whether the new block information satisfies a set of conditions;
    an adding unit, stored in the memory and executed by the processor, configured to perform the adding the new block information;
    a removing unit, stored in the memory and executed by the processor, configured to perform the removing the first transaction information from the local transaction pool;
    a second determining unit, stored in the memory and executed by the processor, configured to perform the determining whether the block pointed by the new block is in the local database;
    a requesting unit, stored in the memory and executed by the processor, configured to perform the requesting the block from the node device;
    a third determining unit, stored in the memory and executed by the processor, configured to perform the determining whether the new block is the milestone block; and
    an updating unit, stored in the memory and executed by the processor, configured to perform the updating the local distributed ledger.

10. A structured directed acyclic graph (DAG)-based block data processing apparatus for building a distributed ledger of a blockchain according to the method of claim 6, the apparatus comprising:
    a memory and a processor, wherein the memory stores machine-executable instructions and the processor reads and executes the machine-executable instructions;
    an acquiring unit, stored in the memory and executed by the processor, configured to perform the acquiring the information; and
    an updating unit, stored in the memory and executed by the processor, configured to perform the updating the local distributed ledger.

11. The apparatus of claim 10, wherein the updating apparatus comprises:
    a traversing unit, stored in the memory and executed by the processor, configured to perform the traversing the information of the blocks directly or indirectly associated with the new milestone block and perform the using the depth-first algorithm or the breadth-first algorithm to traverse the information of the blocks directly or indirectly associated with the milestone blocks;

a first determining unit, stored in the memory and executed by the processor, configured to perform the determining whether the transaction information corresponding to the block conflicts with the local distributed ledger;

a transaction adding unit, stored in the memory and executed by the processor, configured to perform the adding the transaction information to the local distributed ledger;

a second determining unit, stored in the memory and executed by the processor, configured to perform the determining whether the pointer of the block correctly points to the most recent block of the peer chain; and a reward processing unit, stored in the memory and executed by the processor, configured to perform the increasing value awarded.

* * * * *